United States Patent
Barker (10) Patent No.: US 9,473,242 B2
(45) Date of Patent: *Oct. 18, 2016

(54) ESTABLISHING CONNECTION ACROSS A CONNECTION-ORIENTED FIRST TELECOMMUNICATIONS NETWORK IN RESPONSE TO A CONNECTION REQUEST FROM A SECOND TELECOMMUNICATIONS NETWORK

(71) Applicant: Ericsson AB, Stockholm (SE)

(72) Inventor: Andrew James Barker, Nottingham (GB)

(73) Assignee: ERICSSON AB, Stockholm (SE)

( * ) Notice: Subject to any disclaimer, the term of this patent is extended or adjusted under 35 U.S.C. 154(b) by 627 days.

This patent is subject to a terminal disclaimer.

(21) Appl. No.: 13/867,331

(22) Filed: Apr. 22, 2013

(65) Prior Publication Data

US 2013/0251366 A1    Sep. 26, 2013

(51) Int. Cl.
*H04B 10/27* (2013.01)
*H04L 12/46* (2006.01)
(Continued)

(52) U.S. Cl.
CPC ............ *H04B 10/271* (2013.01); *H04L 12/46* (2013.01); *H04L 45/04* (2013.01); *H04L 45/502* (2013.01);
(Continued)

(58) Field of Classification Search
CPC ........... H04B 10/271; H04Q 11/0062; H04Q 11/0066; H04Q 2011/0088; H04Q 2213/1338; H04Q 11/0071; H04Q 2213/13349; H04Q 2213/13348; H04Q 2213/1301; H04Q 2011/0077; H04Q 2213/13389; H04L 45/04; H04L 45/502; H04L 12/46
See application file for complete search history.

(56) References Cited

U.S. PATENT DOCUMENTS 6,068,661 A    5/2000  Shari
6,078,596 A    6/2000  Wellbrock
(Continued)

FOREIGN PATENT DOCUMENTS

CA    EP1026867 A2 *  8/2000  ......... H04L 12/2602
CN    1238618 A    12/1999
(Continued)

OTHER PUBLICATIONS

Bernstein et al., Framework for MPLS-based Control of Optical SDH/SONET Networks: <draft-bms-optical-sdhsonet-mpls-control-frmwrk-00.txt>Nov. 2000, pp. 1-27.
(Continued)

*Primary Examiner* — Chi H Pham
*Assistant Examiner* — Weibin Huang
(74) *Attorney, Agent, or Firm* — Kirschstein et al.

(57) ABSTRACT

A first Multi Protocol Label Switching (MPLS) Internet Protocol (IP) data network transmits data to a second MPLS IP network via a legacy network, which would not otherwise be able to handle the required user network interface (UNI) protocol by configuring the legacy network and its connection computing apparatus (CCA) so that they emulate an MPLS network. When a firt network element (NE) receives a connection (UNI) request from the MPLS network under a UNI protocol, the UNI request is passed to the CCA, which then sets the required connection across the legacy network via a second network element (NE) to an NE of the second network. Once the connection has been set, the CCA instructs the NE to send a return signal to the requesting network indicating that the connection has been successfully set. Data packets may then be transmitted across the network.

18 Claims, 4 Drawing Sheets

(51) Int. Cl.
*H04L 12/715* (2013.01)
*H04L 12/723* (2013.01)
*H04Q 11/00* (2006.01)

(52) U.S. Cl.
CPC ....... *H04Q 11/0062* (2013.01); *H04Q 11/0066* (2013.01); *H04Q 11/0071* (2013.01); *H04Q 2011/0077* (2013.01); *H04Q 2011/0088* (2013.01); *H04Q 2213/1301* (2013.01); *H04Q 2213/1338* (2013.01); *H04Q 2213/13204* (2013.01); *H04Q 2213/13348* (2013.01); *H04Q 2213/13349* (2013.01); *H04Q 2213/13389* (2013.01); *Y10S 370/902* (2013.01)

(56) References Cited

U.S. PATENT DOCUMENTS

| | | | |
|---|---|---|---|
| 6,108,309 A | 8/2000 | Cohoe et al. | |
| 6,115,382 A | 9/2000 | Abe | |
| 6,167,028 A | 12/2000 | Harris | |
| 6,192,402 B1 | 2/2001 | Iwase | |
| 6,260,062 B1 | 7/2001 | Davis et al. | |
| 6,269,076 B1 | 7/2001 | Shamir et al. | |
| 6,292,485 B1 | 9/2001 | Trotta et al. | |
| 6,347,336 B1 | 2/2002 | Song et al. | |
| 6,430,154 B1* | 8/2002 | Hunt | H04L 12/5693 370/230.1 |
| 6,512,745 B1* | 1/2003 | Abe | H04L 12/24 370/232 |
| 6,522,627 B1* | 2/2003 | Mauger | H04L 29/06 370/230 |
| 6,522,629 B1 | 2/2003 | Anderson, Sr. | |
| 6,539,432 B1 | 3/2003 | Taguchi et al. | |
| 6,563,794 B1 | 5/2003 | Takashima et al. | |
| 6,564,341 B1 | 5/2003 | Sundaram et al. | |
| 6,577,425 B1* | 6/2003 | Martinelli | H04Q 11/0478 370/392 |
| 6,597,689 B1 | 7/2003 | Chiu et al. | |
| 6,678,474 B1 | 1/2004 | Masuda et al. | |
| 6,711,171 B1 | 3/2004 | Dobbins et al. | |
| 6,741,585 B1* | 5/2004 | Munoz | H04L 12/4633 370/352 |
| 6,751,660 B1 | 6/2004 | Mansingh et al. | |
| 6,765,921 B1 | 7/2004 | Stacey et al. | |
| 6,775,288 B1 | 8/2004 | Tooker et al. | |
| 6,795,439 B2 | 9/2004 | Watanabe et al. | |
| 6,804,196 B1 | 10/2004 | Kadengal | |
| 6,850,600 B1* | 2/2005 | Boeckman | H04Q 3/0029 379/221.09 |
| 6,891,793 B1 | 5/2005 | Suzuki et al. | |
| 7,010,615 B1 | 3/2006 | Tezuka et al. | |
| 7,013,084 B2 | 3/2006 | Battou et al. | |
| 7,020,696 B1 | 3/2006 | Perry et al. | |
| 7,046,680 B1 | 5/2006 | McDysan et al. | |
| 7,054,557 B1 | 5/2006 | Dasylva et al. | |
| 7,068,680 B1 | 6/2006 | Kaltenmark et al. | |
| 7,168,044 B1 | 1/2007 | Mao | |
| 7,197,546 B1 | 3/2007 | Bagga et al. | |
| 7,313,094 B2 | 12/2007 | Oki et al. | |
| 7,599,620 B2 | 10/2009 | Graves et al. | |
| 7,830,869 B2* | 11/2010 | Barker | 370/389 |
| 7,929,557 B2 | 4/2011 | Kompella | |
| 2001/0033550 A1 | 10/2001 | Banwell et al. | |
| 2001/0033570 A1 | 10/2001 | Makam et al. | |
| 2002/0059274 A1 | 5/2002 | Hartsell et al. | |
| 2002/0141342 A1 | 10/2002 | Furman et al. | |
| 2002/0176131 A1 | 11/2002 | Walters et al. | |
| 2003/0163555 A1 | 8/2003 | Battou et al. | |
| 2004/0179531 A1 | 9/2004 | Bi et al. | |
| 2005/0259571 A1 | 11/2005 | Battou | |
| 2006/0262735 A1 | 11/2006 | Guichard et al. | |

FOREIGN PATENT DOCUMENTS

| | | | |
|---|---|---|---|
| EP | 0883324 | A2 | 12/1998 |
| EP | 0915594 | A2 | 5/1999 |
| EP | 1026867 | A2 | 8/2000 |

OTHER PUBLICATIONS

Hagard et al., Multiprotocol Label Switching in AM Networks, Ericsson Review No. 1, 1998, pp. 32-39.

* cited by examiner

ESTABLISHING CONNECTION ACROSS A CONNECTION-ORIENTED FIRST TELECOMMUNICATIONS NETWORK IN RESPONSE TO A CONNECTION REQUEST FROM A SECOND TELECOMMUNICATIONS NETWORK

CROSS REFERENCE TO RELATED APPLICATIONS

This application is a continuation of U.S. patent application Ser. No. 12/891,167, filed Sep. 27, 2010, now allowed, which is a continuation of U.S. patent application Ser. No. 10/469,802, filed Sep. 2, 2003, now U.S. Pat. No. 7,830,869, which is a national phase application of International Application No. PCT/GB02/00994, filed Mar. 6, 2002.

BACKGROUND OF THE INVENTION

The present invention relates to a method of communicating across a telecommunications network and associated apparatus. In particular, the invention relates to a method of communicating across a telecommunications network, to a telecommunications network, to a network management system for setting connections in a network and to a network element of such networks.

Telecommunications networks, particularly optical networks, have in the past routed data across the network by setting routes by means of a manually operated network management system. When changes are required to be made to the route or routes set in the network, response times can be very long in comparison to the rate of transmission of data.

Significant improvements in routing of data have been made in recent years in the context of electrical networks. One such improvement is the ability of network elements of the network to route data packets without reverting to a separate network management system. Recently, the use of Multi Protocol Label Switching (MPLS), which is currently used in both IP and ATM networks, has been recognised as being particularly advantageous. One of the benefits of MPLS is that network elements of the network are able to route a given data packet quickly, by reference to a label in the data packet. Furthermore, since the routing of data packets does not require the exchange of data with a network management system the use of MPLS has a major advantage in that it facilitates dynamic network control without the delays often associated with networks controlled by a network management system.

It has been proposed, so as to facilitate dynamic network control, to introduce MPLS, in the form of a Generalised Multi-protocol Label Switching (GMPLS) method, into optical networks. However, incorporating GMPLS into an optical network is not straightforward. Two proposals have been made for implementing GMPLS in an optical network as will now be described.

Figure 1:
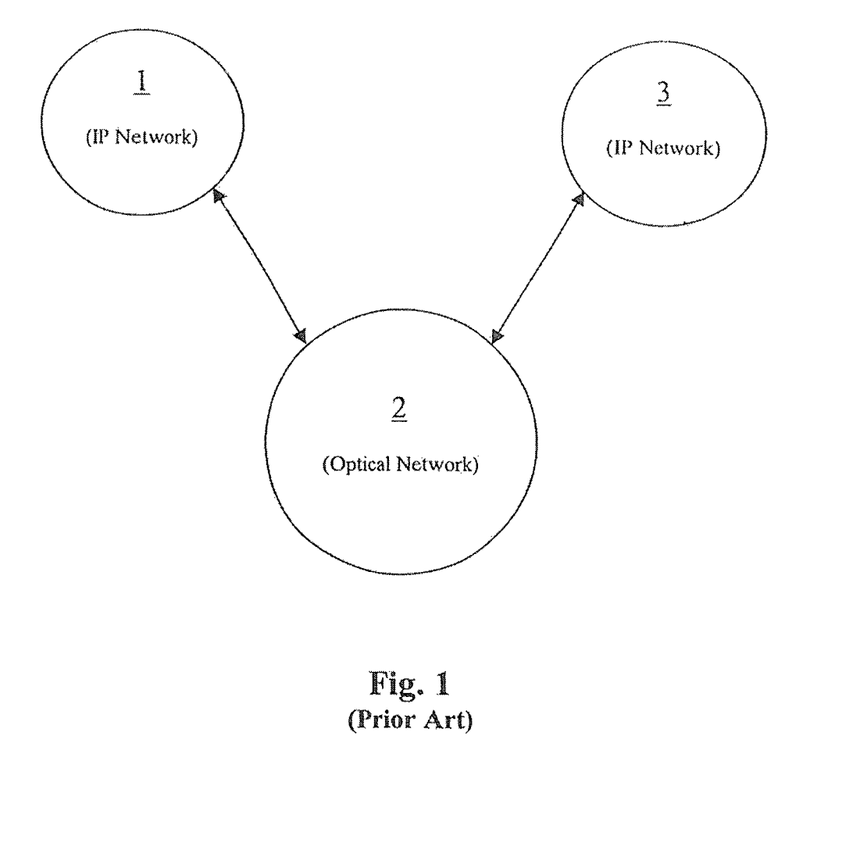
FIGS. 1 and 2 show prior art proposals for a telecommunications network.

The first proposal may be referred to as the "Peer-to-Peer Model" and is illustrated by FIG. 1 of the accompanying drawings. With reference to FIG. 1, a first IP network 1 is connected via an optical network 2 to a second IP network 3. The optical network 2 is required to make available to the IP networks 1, 3 topological information (in the form of IP information) so that data packets can be routed from the first IP network 1 to the second IP network 3 via the optical network 2 by means of IP data in the data packet. If the optical network 2 is privately owned, making such topological information publicly available may however be undesirable. For example, such information may be considered to be commercially sensitive and it may be desired to keep such information confidential.

Figure 2:
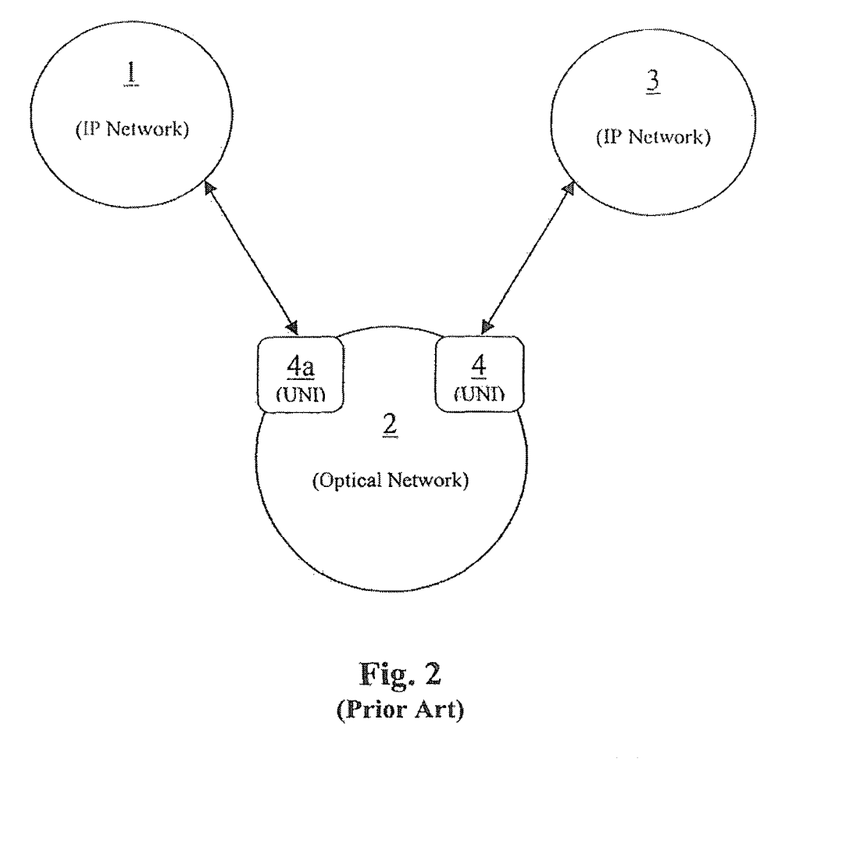

The second proposal, which may be referred to as the "Client-Server Model", does not require the optical network to make public such topological information. In this second proposal, which is described with reference to FIG. 2 of the accompanying drawings, a first IP network 1 is connected via an optical network 2 to a second IP network 3 in a manner similar to that of the first proposal. However, in this proposal the interfaces between the first and second IP networks 1, 3 (the clients) and the optical network 2 (the server) each include a user network interface 4 (UNI). Thus the first IP network 1, via a first UNI 4a, effectively request a connection across the optical network 2 by means of IP data in a data packet. Topology information relating to the optical network 2 is however not made available outside the optical network 2.

Both of the proposals described above suffer from a significant disadvantage. In order for the optical network to operate in a GMPLS environment it is necessary, in the proposals made, for the network elements of the optical network to process and handle network topology information and to set up and tear down network connections. In order for the individual network elements to be able to perform such tasks the network elements each require significant processing capability and access to significant amounts of memory. Whilst such requirements can be met when installing new optical networks, many existing optical network elements are not able to perform at the required level. Replacing such existing optical networks (often referred to as legacy networks) would be costly and is therefore undesirable.

BRIEF SUMMARY OF THE INVENTION

It is therefore an object of the present invention to provide a method of communicating across a telecommunications network which allows a given protocol, for example a protocol used in an MPLS environment, to be used in combination with other networks, for example optical networks, and which mitigates one or more of the problems associated with the above-mentioned proposals. The present invention also seeks to provide suitable means or apparatus for performing such a method or aspects of such a method.

According to a first aspect of the invention there is provided a method of operating a connection-oriented communications network, the communications network comprising a plurality of network elements in which connections across the network elements are established by a network management system; the communications network being connectable to a second communications network by an edge network element, the second communications network comprising a plurality of network elements each of which is capable of making connections or routing data across the second network in accordance with a connection request received by the element; the connection request being in accordance with a predetermined protocol, the method being for establishing a connection across the connection-oriented network in response to a connection request from the second network and characterised by: the edge network element upon receiving a connection request from the second network, sending to the network management system information relating to the connection request; the network management system sending signals to set a connection across the network in response to said information received from the edge network element; and the network management system causing the edge network element to send a return signal according to the predetermined protocol to the second network indicating the status of the setting of a connection.

The method of the present invention enables a connection-oriented network to establish connections in response to connection requests, which it would otherwise be unable to handle, by the steps of passing the connection request from a suitably configured edge network element to a suitably configured network management system, which is able to process the request, make the connection in accordance with the request and respond via the edge network element in accordance with the given protocol. As far as the second network is concerned the connection-oriented communications network is able to communicate with it under the given protocol. In the context of the method of the invention, the manner in which connection requests are made can be considered as being a client-server arrangement, in which the connection-oriented network is the server network and the second network is the client network.

The return signal indicating the status of the setting of the connection may for example indicate either that the connection has been successfully made or that the connection could not be made. After the second network receives a return signal indicating that the connection has been successfully made, data can then be transmitted from the second network across the communications network.

Advantageously the connection-oriented communications network is further connectable to a third communications network by a further edge network element, the third network comprising a plurality of network elements each of which is capable of making connections or routing data across the third network in accordance with a connection request received by the element, and the method further comprises: the network management system causing the further edge network element to send a connection request according to the predetermined protocol to the third network thereby enabling connection of the second and third networks via the connection-oriented network.

Preferably the connection-oriented network is operated such that, in use, topology information relating to the network is not made available outside the network to for example the second and/or third networks. Of course, information concerning the possible connections to and from network elements within, but at the edge of the network, may be made available to network elements outside the communications network and accordingly such information may be considered as not relating to topology information relating to the communications network.

Advantageously the predetermined protocol is a user network interface (UNI) protocol. The UNI protocol may be such that topology information is not revealed over the interface between the communications networks. The user network interface protocol used may, for example, be in accordance with the standards laid down by the Optical Interface Forum (OIF). An appropriate standard is described in document number OIF 2000.125 available from the Optical Interface Forum. In the case where the communications network is connected to MPLS enabled networks, the arrangement may be such that the MPLS network elements require a connection request in order to make a connection and transmit data. Such MPLS network elements may also be arranged automatically to send appropriate connection requests. Thus, when setting a connection from the communications network to the third network that is MPLS enabled, the network management system advantageously causes the further edge network element to send an appropriate connection request, for example, a UNI request.

The method may be such that other protocols are used when further connection requests are made between network elements of the network. For example, a network network interface (or NNI) protocol may be used. An NNI protocol may be especially convenient when connection requests are made between MPLS enabled network elements. The NNI protocol may be such that topology information is revealed over the interface between the relevant network elements.

According to a second aspect of the invention there is provided a connection-oriented communications network comprising a plurality of network elements in which connections across the network elements are established by a network management system; the communications network being adapted to be interoperable with a second communications network by an edge network element, the second network comprising a plurality of network elements each of which is capable of making connections or routing data across the second network in accordance with a connection request received by the element; the connection request being in accordance with a predetermined protocol, the connection-oriented network being characterised by the edge network element upon receiving connection request from the second network, sending to the network management system information relating to the connection request; the network management system sending signals to the network elements to set a connection across the network in response to said information received from the edge network element; and the network management system causing the edge network element to send a return signal according to the predetermined protocol to the second network indicating the status of the setting of a connection.

The present invention finds particular application to legacy connection-oriented networks that comprise network elements unable to make connections or route data in accordance with connection requests. The step in which the edge network element sends to the network management system information relating to the connection request can comprise relaying, or repeating, the connection request. The edge network element may therefore be required to perform little or preferably no processing of the connection request. Conveniently the edge network element can comprise a legacy edge network element that has been appropriately adapted. Conversion of the legacy network element may include a step of programming the network element with appropriate updated software. The requirements of such computer software will be apparent to the relevant persons skilled in the art and, as such, further details of such software are not provided here. Alternatively, the conversion could be made by means of extra hardware in addition to, or instead of, providing such software.

The network management system advantageously comprises the legacy network management system that has been appropriately adapted. The conversion of such a legacy network management system may include a step of programming the network management system with appropriate updated software. Again the requirements of such computer software would be apparent to those skilled in the art, when presented with the details of the present invention. Alternatively, the conversion could be made by means of extra hardware in addition to, or instead of, providing such software.

Advantageously the communications network further comprises a further edge network element for connecting the communications network to a third communications network, the third network comprising a plurality of network elements each of which is capable of making connections or routing data across the third network in accordance with a connection request received by the element, the network management system being configured to cause the further edge network element to send a connection request according to the predetermined protocol to the third network thereby enabling connection of the second and third networks via the communications network. Such a network is advantageous where the third network requires a connection request according to the predetermined protocol to be received before a connection can be made. Since the network management system causes the further edge network to send the connection request this eliminates the need for the further edge network element to be able to itself generate the connection request.

Preferably the communications network is operated such that, in use, topology information relating to the network is not made available outside the network.

Advantageously the predetermined protocol is a user network interface (UNI) protocol. The network management system may also be able to handle that same UNI protocol insofar as is necessary to enable it to cause the edge network element to send the return signal under the same UNI protocol. The relevant edge network elements of the network may simply be programmed with appropriate software to enable them to handle the same UNI protocol.

Preferably the second and/or third networks are packet based networks, such as Internet Protocol (IP) networks in which data packets are routed by the network elements in dependence upon the connection request within the packets. Alternatively the second and/or third networks can comprise Asynchronous Transfer Mode (ATM) networks, and alike, in which connections are established by the network elements in dependence upon connection requests. The invention finds particular application for connection to networks able to handle Multi-Protocol Label Switching (MPLS). It will be understood that multi-protocol label switching may take many forms, any of which could be used in the context of the present invention. For example, a generalised form of MPLS (GMPLS) may be used. The form of multi-protocol label switching used may however be conveniently chosen to be in accordance with an accepted standard, for example, a standard set by the Internet Engineering Task Force.

According to a further aspect of the invention there is provided an edge network element for use in a communications network in accordance with the second aspect of the invention.

According to a yet further aspect of the invention there is provided a network management system for use in a communications network in accordance with the second aspect of the invention.

BRIEF DESCRIPTION OF THE SEVERAL VIEWS OF THE DRAWINGS

Embodiments of the present invention will now be described by way of example only with reference to the accompanying schematic drawings, of which:

FIGS. 1 and 2 relate to prior art proposals and are described above.

DETAILED DESCRIPTION OF THE INVENTION

Figure 3:
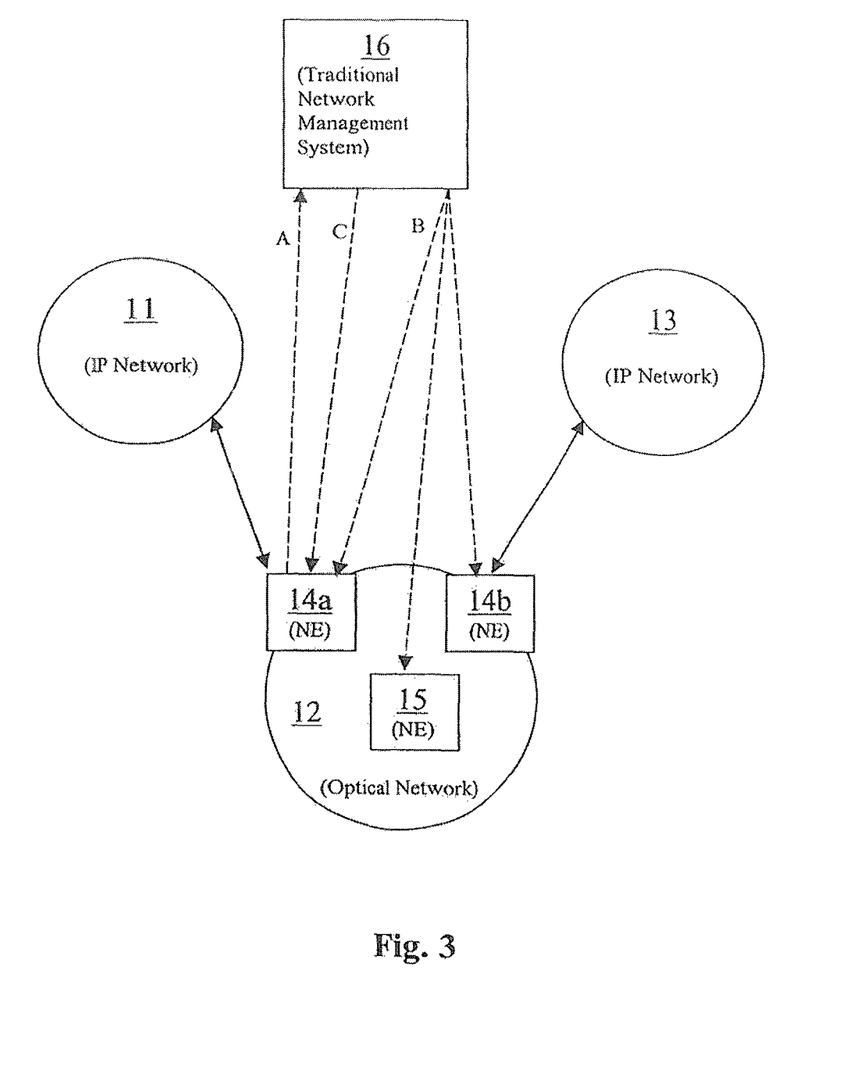
FIG. 3 illustrates a telecommunications network in accordance with a first embodiment of the invention.

A telecommunications network according to the first embodiment of the invention is shown in FIG. 3. With reference to FIG. 3 the network includes a first MPLS enabled IP network 11 connectable to a second MPLS enabled IP network 13 via a legacy optical network 12. The legacy optical network 12 includes a plurality of internal network elements 15 (only one of which is shown in FIG. 3 for the sake of clarity) and a plurality of edge network elements 14a, 14b (only two of which are shown). The legacy optical network 12 is also connected to a traditional network management system 16.

At the interface between the first IP network 11 and the optical network 12, signals may be received and sent by an edge network element 14a of the optical network 12. Similarly, at the interface between the second IP network 13 and the optical network 12, signals may be received and sent by an edge network element 14b of the optical network 12. Network access and connection requests may be made through the edge network elements of the optical network. The network may thus be considered as forming a client/server system with interfaces, between the server (the optical network 12) and the client (the first or second IP networks 11, 13).

The protocol used at such interfaces, in relation to the provision of network access and connection requests, is a UNI (user network interface) protocol.

A UNI protocol is also used throughout the first and second IP networks 11, 13 and connection requests in the form of UNI requests are, in the IP networks, processed by the local network elements, connections being established by use of the topology protocols running across the network. The topology protocols used may for example be an OSPF (Open Shortest Path First) protocol. However, the network elements within the legacy optical network 12 are not able to process such requests locally. The making of a connection across the optical network 12, including the handling of UNI requests made to edge network elements of the optical network 12, will now be described.

A UNI request is sent to a first edge network element 14a of the optical network 12 from a network element (not shown separately) of the first IP network 11, the request effectively requesting a connection to a network element of the second IP network 13. The request is sent (arrow A) directly to the network management system 16. The network management system 16 then processes the request and determines an appropriate connection across the optical network 12. The network management system 16 then sends signals (arrows B) instructing the edge network element 14a, the relevant internal network elements 15 and a second network element 14b of the optical network to establish the required connection. The network management system 16 then formulates a suitable response for sending to the network element of the first network 11 that sent the UNI request. The network management system 16 then sends (arrow C) a signal to the edge network element 14a originally receiving the UNI request, causing that edge network element 14a to send such a suitable response to that network element of the first network 11.

The response sent from the edge network element 14a originally receiving the UNI request to the network element of the first network 11 indicates either that a connection has been successfully made or that the connection failed, as appropriate. If the connection is successfully made the network element of the first network 11 is then able to send data via the optical network 12 to the appropriate network element of the second IP network 13.

The IP networks 11, 13 are not able to discover the topology of the optical network 12, as such information is not made available outside of the optical network 12.

Thus it will be appreciated that such an arrangement enables a client/server UNI network to be established without the need for network elements of the server network (the legacy optical network 12) to run locally any topology protocols. This is especially advantageous in legacy networks, such as the optical network 12 illustrated in FIG. 3, where the network elements do not have the required memory and/or processing power to handle such protocols.

A telecommunications network according to a second embodiment of the invention is illustrated with reference to FIG. 4. In this second embodiment, MPLS enabled network elements are combined with legacy network elements in a common transport network. The MPLS enabled parts of the network can operate with full topology protocols, whereas the legacy part of the network effectively emulates a UNI interface to enable connections across the legacy part of the network to be provided automatically on request.

Figure 4:
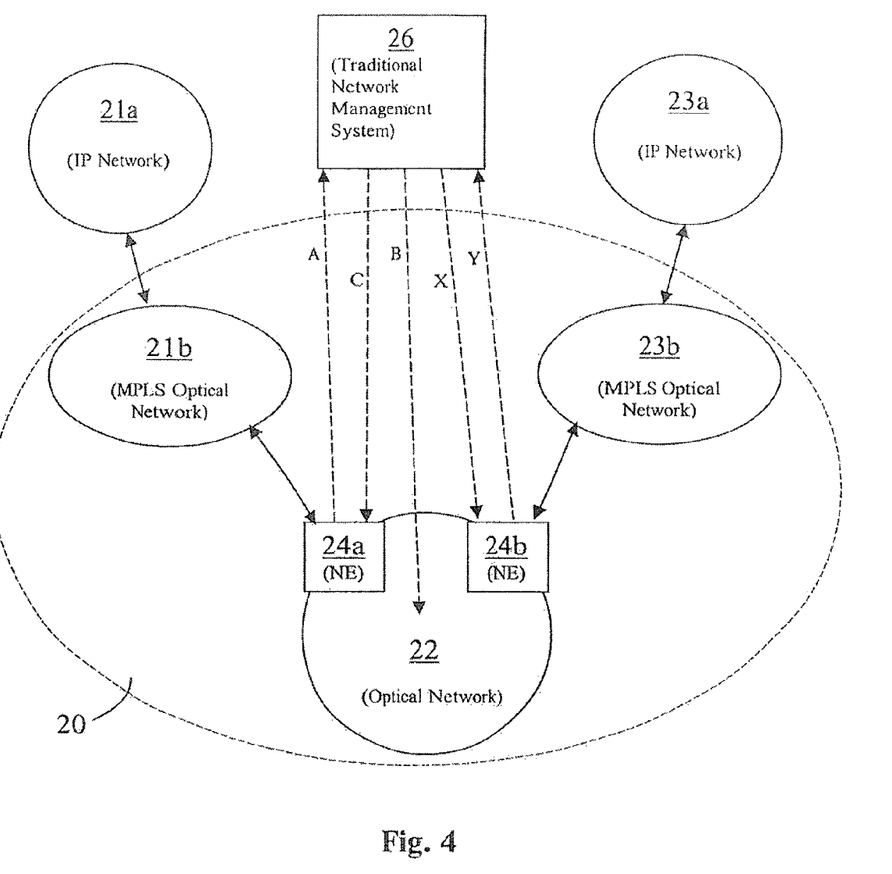
FIG. 4 illustrates a telecommunications network in accordance with a second embodiment of the invention.

With reference to FIG. 4, the network includes a first MPLS enabled IP network 21a connectable to a second MPLS enabled IP network 23a via an optical network 20. The optical part of the network comprises a legacy optical network 22 connectable between first and second MPLS enabled optical networks 21b, 23b. The legacy optical network 22 includes a plurality of internal network elements (not shown) and a plurality of edge network elements 24a, 24b and is connected to a traditional network management system 26, in a manner similar to that of the legacy optical network 12 shown in FIG. 3.

In FIG. 4, the first IP network 21a has a UNI interface to the optical network 20. Topology information relating to the first MPLS optical network 21b, the second MPLS optical network 23b and the legacy optical network 22 is not made available outside each network, respectively. As far as the first IP network 21a is concerned the optical network 20 may, or may not, be separated into MPLS enabled and legacy optical networks. The making of a connection from the first IP network 21a to the second IP network 23a will now be described.

The first IP network 21a sends a UNI request to the first MPLS enabled optical network 21b of the optical network 20, the UNI request effectively requesting a connection to a network element (not shown separately) of the second IP network 23a via the optical network 20. The UNI request is processed locally within the first MPLS optical network 21b, and the requested connection made to the edge of that network, where it meets another UNI interface (the interface between the first MPLS optical network 21b and the legacy optical network 22). A new UNI request is therefore sent from an edge network element of the first MPLS optical network 21b to a first edge network element 24a of the legacy optical network 22. This UNI request effectively requests a connection from the interface between the MPLS optical network 21b and the legacy optical network 22 to the destination network element of the second IP network 23a. Since the network receiving the UNI request is a legacy optical network 22, the request cannot be processed locally by the network elements of the network 22.

In a manner similar to that described above with reference to the first embodiment, the request is sent (arrow A) directly to the traditional network management system 26. The network management system 26 then processes the request and determines an appropriate connection across the optical network 22. The network management system 26 then sends signals (arrow B) instructing the edge network element 24a, the relevant internal network elements and a second network element 24b of the optical network to establish the required connection. In this embodiment, however, the legacy optical network 22 interfaces to another optical network, which is MPLS enabled (i.e. the second MPLS optical network 23b).

The second MPLS optical network 23b requires a UNI request to cause it to make the connection to the second IP network 23a. Thus the network management system 26 sends (arrow X) to the second edge network element 24b of the legacy network 22a signal causing the second edge network element 24b to send a UNI request to an edge network element of the second MPLS optical network 23b. This UNI request again effectively requests a connection to be made to the destination network element of the second IP network 23a. The UNI request is processed locally within the second MPLS optical network 23b, and the requested connection made across that network to the destination network element of the second IP network 23a.

The edge network element of the second MPLS optical network 23b receiving the UNI request from the second edge network element 24b of the legacy network 22, sends a return signal under the UNI protocol to the second edge network element 24b, the return signal indicating that the requested connection has been successfully made. The return signal is sent (arrow Y) directly to the network management system 26. On receipt of that return signal the network management system 26 formulates a suitable response for sending to the network element of the first MPLS optical network 21b that sent the UNI request to the legacy network 22. The network management system 26 then sends (arrow C) a signal to the edge network element 24a originally receiving the UNI request from the first MPLS optical network 21b, causing that edge network element 24a to send such a suitable response under the UNI protocol to the relevant edge network element of the first MPLS optical network 21b.

The indication of the successful connection is then finally relayed to the first IP network 21a by the first MPLS optical network 21b to complete the connection process. The network element of the first IP network 21a is then able to send data via the optical network 20 to the appropriate network element of the second IP network 23a. Should the process fail at any stage, then a failure response is sent back to the requesting network. The network is arranged such that on such a failure any intermediate connections that have been made in relation to the given connection request are cleared down.

As will be appreciated, various modifications may be made to the above described embodiments. For example, two IP networks could be connected via an optical network, such that a first IP network is connected to a single MPLS optical network, which is connected to a single legacy network, which is connected to a second IP network. In such a case, the receipt from the first network of a UNI request requesting connection to the second IP network would be handled in a similar manner to that described with reference to the first embodiment. The UNI request passed on by the MPLS optical network would be passed from an ingress legacy network element to the network management system of the legacy network, which would set a connection across the legacy network to the second IP network, and then cause the ingress legacy network element to send an appropriate response to the requesting IP network, data thereafter being transmitted from the first IP network across the optical network and to the second IP network.

Also, two IP networks could be connected via an optical network, such that a first IP network is connected to a single legacy network, which is connected to a single MPLS optical network, which is connected to a second IP network. In such a case, the receipt from the first network of a UNI request requesting connection to the second IP network would be handled in a similar manner to that described with reference to the second embodiment. The UNI request would be passed from an ingress legacy network element to the network management system of the legacy network, which would set a connection, send a UNI request via an egress legacy network element to the MPLS optical network, receive an appropriate response via the egress legacy network element from the MPLS optical network, and then cause the ingress legacy network element to send an appropriate response to the requesting IP network, data thereafter being transmitted from the first IP network across the optical network and to the second IP network.

Other permutations of legacy optical, optical MPLS, and IP networks will of course be apparent to those skilled in the art.

Whilst MPLS optical networks have been referred to above, the embodiments described would of course also be of use if the MPLS optical networks were in the form of GMPLS (generalised MPLS) optical networks.

The IP based networks described above need not be IP data networks and could alternatively be ATM data networks, since such networks may also be used with MPLS and user network interfaces (UNI)

The topology protocols used across the MPLS networks need not be OSPF. For example, the topology protocol used may alternatively be an IS/IS (Intermediate System to Intermediate System Routing Exchange) protocol from the OSI (Open Systems Interconnection).

The invention claimed is:

1. A method of operating a connection-oriented first communications network having a plurality of first network elements in which connections across the first network elements are determined by a connection computing apparatus, the connection-oriented first communications network being connectable to a second communications network by a network element, the second communications network having a plurality of second network elements, the method being performed to establish a connection across the connection-oriented first communications network in response to a connection request from the second communications network, the method comprising the steps of:
   the connection computing apparatus receiving from the network element information relating to the connection request which the network element received from the second communications network;
   the connection computing apparatus sending to the network element a signal indicative of a status of the connection; and
   clearing down any intermediate connections established in relation to the connection request if setting of the connection failed.

2. The method according to claim 1, wherein the connection-oriented first communications network is further connectable to a third communications network by a further network element, the third communications network having a plurality of third network elements, the method further comprising the step of causing the further network element by the connection computing apparatus to send a connection request to the third communications network, thereby enabling a connection of the second and third communications networks via the connection-oriented first communications network.

3. The method according to claim 1, and further comprising the step of operating the connection-oriented first communications network such that, in use, topology information relating to the connection-oriented first communications network is not made available outside the connection-oriented first communications network.

4. The method according to claim 1, wherein the connection request is made in a client-server arrangement, in which the connection-oriented first communications network is a server network, and in which the second communications network is a client network.

5. The method according to claim 1, wherein the connection-oriented first communications network and the second communications network use different switching or routing techniques.

6. The method according to claim 1, and further comprising the network element sending a response to the second communications network indicating the status of the connection.

7. The method according to claim 1, wherein the connection request includes routing information.

8. The method according to claim 1, wherein the second network elements of the second communications network are operative for establishing connections or routing data across the second communications network.

9. The method according to claim 1, comprising establishing the connection in response to information received from the connection computing apparatus.

10. A network element for use in a connection-oriented first communications network having a plurality of first network elements in which connections across the first network elements are determined by a connection computing apparatus, the connection-oriented first communications network being connectable to a second communications network by the network element, the second communications network having a plurality of second network elements, the network element comprising at least one interface and a controller for controlling the interface, wherein said at least one interface is operable for receiving a connection request from the second communications network to establish a connection across the connection-oriented first communications network, and for sending information relating to the connection request to the connection computing apparatus, and for receiving from the connection computing apparatus a signal indicative of a status of the requested connection, the network element being operable for clearing down any intermediate connections established in relation to the connection request if setting of the connection failed.

11. The network element according to claim 10, wherein the connection-oriented first communications network is an optical communications network.

12. The network element according to claim 10, wherein the second network elements of the second communications network are operative for establishing connections or routing data in accordance with multi-protocol label switching (MPLS).

13. The network element according to claim 10, adapted to relay the connection request to the connection computing apparatus.

14. The network element according to claim 10, wherein the connection is established in response to information received from the connection computing apparatus.

15. A connection computing apparatus for use in a connection-oriented first communications network having a plurality of first network elements in which connections across the first network elements are determined by the connection computing apparatus, the connection-oriented first communications network being connectable to a second communications network by a network element, the second communications network having a plurality of second network elements, the connection computing apparatus comprising an interface to receive information relating to a connection request from the network element, wherein the network element received the connection request from the second communications network, the connection computing apparatus comprising a processor configured to determine a connection across the connection-oriented first communications network in response to the received information relating to the connection request; and the connection computing apparatus being further adapted to send to the network element, via said interface, a signal indicative of a status of the requested connection, the network element being operable for clearing down any intermediate connections established in relation to the connection request if setting of the connection failed.

16. The connection computing apparatus according to claim 15, and being further adapted to send information to network elements of the connection-oriented first communications network to set the connection in response to the information received from the network element.

17. A method of operating a connection-oriented first communications network having a plurality of first network elements in which connections across the first network elements are determined by a connection computing apparatus, the connection-oriented first communications network being connectable to a second communications network by a network element, the second communications network having a plurality of second network elements, the method being performed to establish a connection across the connection-oriented first communications network in response to a connection request from the second communications network, the method comprising the steps of:
  upon the network element receiving the connection request from the second communications network, sending to the connection computing apparatus information relating to the connection request;
  the network element receiving a signal from the connection computing apparatus indicative of a status of the requested connection; and
  clearing down any intermediate connections established in relation to the connection request if setting of the connection failed.

18. The method according to claim 17, comprising the network element receiving from the connection computing apparatus a signal to set the connection, wherein the signal to set the connection is in response to said information from the network element.

* * * * *